(12) United States Patent
Li et al.

(10) Patent No.: US 8,742,051 B2
(45) Date of Patent: Jun. 3, 2014

(54) METHOD OF PREPARING A BODIED SILOXANE RESIN INCLUDING M, Q, AND T-PROPYL UNITS AND CAPPED WITH ADDITIONAL M UNITS

(71) Applicant: Dow Corning Corporation, Midland, MI (US)

(72) Inventors: Lok Ming Eva Li, Midland, MI (US); Lori Ann Stark-Kasley, Midland, MI (US); Gary Michael Wieber, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 13/832,956

(22) Filed: Mar. 15, 2013

(65) Prior Publication Data

US 2013/0203945 A1 Aug. 8, 2013

Related U.S. Application Data

(63) Continuation of application No. 13/179,148, filed on Jul. 8, 2011, now Pat. No. 8,604,151, which is a continuation-in-part of application No. 10/585,837, filed as application No. PCT/US2005/002451 on Jan. 20, 2005, now Pat. No. 8,124,710.

(60) Provisional application No. 60/541,002, filed on Feb. 2, 2004.

(51) Int. Cl.
*C08G 77/38* (2006.01)

(52) U.S. Cl.
USPC ............................................ 528/34; 528/491

(58) Field of Classification Search
None
See application file for complete search history.

(56) References Cited

U.S. PATENT DOCUMENTS

| | | |
|---|---|---|
| 2,814,601 A | 11/1957 | Currie et al. |
| 2,857,356 A | 10/1958 | Goodwin |
| 5,063,254 A | 11/1991 | Nakos |
| 5,075,103 A | 12/1991 | Halloran et al. |
| 5,085,859 A | 2/1992 | Halloran et al. |
| 5,110,890 A | 5/1992 | Butler |
| 5,330,747 A | 7/1994 | Krzysik |
| 5,733,537 A | 3/1998 | Halloran et al. |
| 5,837,223 A | 11/1998 | Barone et al. |
| 6,036,947 A | 3/2000 | Barone et al. |
| 6,071,503 A | 6/2000 | Drechsler et al. |
| 6,074,654 A | 6/2000 | Drechsler et al. |
| 6,139,823 A | 10/2000 | Drechsler et al. |
| 6,340,466 B1 | 1/2002 | Drechsler et al. |
| 6,406,683 B1 | 6/2002 | Drechsler et al. |
| 6,730,397 B2 | 5/2004 | Melancon et al. |
| 6,825,264 B2 | 11/2004 | Oda et al. |
| 7,816,419 B2 | 10/2010 | Tsuchida et al. |
| 8,124,710 B2 | 2/2012 | Cook et al. |
| 2002/0031488 A1 | 3/2002 | Kanji et al. |
| 2002/0058054 A1 | 5/2002 | Arnaud |
| 2002/0114773 A1 | 8/2002 | Kanji et al. |
| 2002/0187170 A1 | 12/2002 | Pavlin |
| 2003/0236387 A1 | 12/2003 | Pavlin |
| 2004/0180011 A1 | 9/2004 | Schlosser |
| 2007/0148115 A1 | 6/2007 | Cook et al. |
| 2013/0224130 A1* | 8/2013 | BUI et al. .................. 424/59 |

FOREIGN PATENT DOCUMENTS

| | | |
|---|---|---|
| EP | 0336633 B1 | 8/1996 |
| GB | 2294392 A | 5/1996 |
| GB | 2319527 A | 5/1998 |
| JP | 61-158910 A | 7/1986 |
| JP | 04-139114 A | 5/1992 |
| JP | 6072085 B | 9/1994 |
| JP | 199772085 B | 9/1994 |
| JP | 07-330536 A | 12/1995 |
| JP | 10067856 A | 3/1998 |
| KR | 2002054603 A | 7/2002 |
| WO | WO 97/17058 A1 | 5/1997 |
| WO | WO 02/089760 A1 | 11/2002 |
| WO | WO 2005075542 A1 | 8/2005 |
| WO | WO 2005075567 A1 | 8/2005 |
| WO | WO 2009/071662 A2 | 6/2009 |
| WO | WO 2012/052439 A1 | 4/2012 |

OTHER PUBLICATIONS

English language abstract for JP 04-139114 extracted from PAJ database on Apr. 15, 2013, 8 pages.
English language abstract and translation for JP 07-330536 extracted from PAJ database on Apr. 15, 2013, 21 pages.
English language abstract for JP 61-158910 extracted from PAJ database on Apr. 15, 2013, 5 pages.
English language abstract for JP10067856 extracted from the espacenet.com database on Oct. 20, 2011, 8 pages.
English language abstract for JP6072085 extracted from the espacenet.com database on Oct. 20, 2011, 9 pages.
English language abstract for KR 2002054603 extracted from PAJ database on Apr. 15, 2013, 10 pages.

\* cited by examiner

*Primary Examiner* — Marc Zimmer
(74) *Attorney, Agent, or Firm* — Howard & Howard Attorneys PLLC

(57) ABSTRACT

A bodied siloxane resin comprises M, Q, and T-propyl units and is capped with additional M units. The bodied siloxane resin contains less silanol groups than the bodied siloxane resin before being capped with additional M units.

17 Claims, No Drawings

METHOD OF PREPARING A BODIED SILOXANE RESIN INCLUDING M, Q, AND T-PROPYL UNITS AND CAPPED WITH ADDITIONAL M UNITS

CROSS-REFERENCE TO RELATED APPLICATIONS

This application is a continuation of U.S. Non-Provisional patent application Ser. No. 13/179,148, filed on Jul. 8, 2011 which is a continuation-in-part of U.S. Non-Provisional patent application Ser. No. 10/585,837 filed on Jul. 12, 2006, which is a U.S. national stage filing of PCT International Patent Application Serial No. PCT/US2005/002451 filed on Jan. 20, 2005, which claims the benefit of U.S. Provisional Patent Application Ser. No. 60/541,002 filed on Feb. 2, 2004, the disclosures of which are hereby incorporated by reference in their entirety.

BACKGROUND OF THE INVENTION

Siloxane resins are important in many applications, such as protective coating applications.

One particular subclass of siloxane resins, bodied siloxane resins, has found particular utility in protective coating applications. However, bodied siloxane resins may be unstable, and their properties may degrade over time. For example, the molecular weight of the bodied siloxane resins may increase after aging. This aging may also lead to an increase in the viscosity of the bodied siloxane resin, or the viscosity of a solution containing the bodied siloxane resin. This increase in viscosity is particularly undesirable in protective coating applications.

While the use of bodied siloxane resins in protective coating applications has led to desirable properties, a need exists to alter the properties of the bodied siloxane resins used in such compositions.

SUMMARY OF THE INVENTION AND ADVANTAGES

A bodied siloxane resin comprising M, Q, and T-propyl units and capped with additional M units is provided. The bodied siloxane resin capped with additional M units contains less silanol groups than the bodied siloxane resin before being capped with additional M units.

The bodied siloxane resin capped with additional M units has an improved stability over the bodied siloxane resin before being capped with additional M units. The bodied siloxane resin capped with additional M units has a molecular weight that does not increase significantly, after aging, from the initial molecular weight.

DETAILED DESCRIPTION OF THE INVENTION

A bodied siloxane resin comprises M, Q, and T-propyl units and is capped with additional M units. Typically, the bodied siloxane resin capped with additional M units contains less silanol groups than the bodied siloxane resin before being capped with additional M units. The bodied siloxane resin capped with additional M units according to this invention has utility in a wide variety of applications including, but not limited to, protective coating applications.

"The bodied siloxane resin capped with additional M units" is hereinafter referred to as "the post-capped bodied siloxane resin." Further, "the bodied siloxane resin before being capped with additional M units" is hereinafter referred to as "the bodied siloxane resin."

M, D, T, and Q units and nomenclature relying on such units are known in the art. For instance, an MTQ siloxane resin includes M units, T units, and Q units.

The term "bodied" refers to a siloxane resin that has undergone a process of bodying. Bodying is a process designed to increase the molecular weight of conventional siloxane resins to make them more desirable in applications that use such conventional siloxane resins. During the bodying process, it is believed that a portion of excess silanol groups are reacted from the conventional siloxane resin to be bodied such that some of the low molecular weight material of the siloxane resin interacts to form a conventional high-molecular weight bodied siloxane resin. Bodying may be completed by heating the siloxane resin to be bodied in the presence of suitable catalysts, such as alkaline or acidic catalysts. Other methods of bodying are also contemplated.

References to the bodied siloxane resin are intended to mean a combination of, or a reaction between an unbodied T-propyl siloxane resin and an unbodied MQ siloxane. The bodying of the unbodied T-propyl siloxane resin with the unbodied MQ siloxane resin results in the bodied siloxane resin having a higher molecular weight than the unbodied T-propyl siloxane resin or the unbodied MQ siloxane resin.

As used herein, the term "capped" refers to the reaction of silanol groups present in the bodied siloxane resin with a silicon-containing M group capping agent, which is described in greater detail below.

The post-capped bodied siloxane resin contains less silanol groups than the bodied siloxane resin. The additional M units are bonded in place of some of the silanol groups. It is theorized that the reduction in the number of silanol groups leads to improved stability. The M units may bond at a variety of locations on the bodied siloxane resin, depending on the location of the silanol groups. This improved stability is evident during aging, during accelerated aging, and during solvent exchange operations. The improved stability may also be evident when the post-capped bodied siloxane resin is utilized in downstream formulations in combination with other materials.

In one configuration, the bodied siloxane resin comprises from 0.02 to 0.50 moles of silanol groups per mole of silicon with the caveat that the bodied siloxane resin contains more silanol groups than the post-capped bodied siloxane resin. Alternatively, the bodied siloxane resin comprises from 0.05 to 0.30 moles of silanol groups per mole of silicon, or from 0.05 to 0.15 moles of silanol groups per mole of silicon.

In one embodiment, the post-capped bodied siloxane resin typically comprises from 0.02 to 0.20 moles of silanol groups per mole of silicon. In an alternative embodiment, the post-capped bodied siloxane resin comprises from 0.03 to 0.15 moles of silanol groups per mole of silicon, or from 0.05 to 0.10 moles of silanol groups per mole of silicon.

When the bodied siloxane resin is capped with the M units, the amount of silanol groups decreases from >0 to <0.10 moles of silanol groups per mole of silicon from the bodied siloxane resin to the post-capped bodied siloxane resin. Alternatively, the amount of silanol groups decreases from >0 to <0.05 or from >0 to <0.03 moles of silanol groups per mole of silicon from the bodied siloxane resin to the post-capped bodied siloxane resin.

The molecular weight of the bodied siloxane resin or the post-capped bodied siloxane resin may increase during the aging process. The molecular weight instability can cause conventional bodied siloxane resins to possess undesirable characteristics. The natural aging process can be simulated by heating a sample in an oven over an extended period of time. This simulated aging allows the prediction of the molecular weight instability as would typically be experienced by conventional siloxane resins during the natural aging process.

Simulated aging is conducted with an oven that is maintained at a temperature of about 110° C. Simulated aging may be conducted with heating equipment other than ovens and other temperatures may be used to simulate aging. The initial molecular weight ($M_{wi}$) refers to the molecular weight of the bodied siloxane resin or the molecular weight of the post-capped bodied siloxane resin, respectively, before they undergo simulated aging. The aged molecular weight ($M_{wa}$), refers to the molecular weight of the bodied siloxane resin or the molecular weight of the post-capped bodied siloxane resin, respectively, after they have been aged at 110° C. for 70 hours.

The post-capped bodied siloxane resin undergoes less of a molecular weight increase during the aging process than the bodied siloxane resin. In one embodiment, $M_{wa}$ increases 100% or less from the $M_{wi}$ of the post-capped bodied siloxane resin. In another embodiment, $M_{wa}$ of the post-capped bodied siloxane resin increases 50%, 25%, 15%, 5%, or 3% or less from the $M_{wi}$ of the post-capped bodied siloxane resin.

The post-capped bodied siloxane resin may include the units: $(R^1_3SiO_{1/2})_a$; $(R^2_2SiO_{2/2})_b$; $(R^3SiO_{3/2})_c$; and $(SiO_{4/2})_d$. 'a' (the mole fraction of M units) may range from 0.05 to 0.5, or from 0.15 to 0.30, or from 0.15 to 0.20. 'b' (the mole fraction of D units) may range from 0 to 0.3, from 0 to 0.2, or from 0 to 0.1. 'c' (the mole fraction of T units) is typically >0, 0.30, 0.40, 0.50, 0.60, 0.70, 0.80, 0.90, or 0.95. 'd' (the mole fraction of Q units) may range from 0.05 to 0.60, from 0.15 to 0.45, or from 0.20 to 0.30. In the above formula, a+b+c+d=1.

In embodiments in which the post-capped bodied siloxane resin includes the units set forth above, the bodied siloxane resin before being capped with additional M units typically comprises the units: $(R^1_3SiO_{1/2})_{a'}$; $(R^2_2SiO_{2/2})_{b'}$; $(R^3SiO_{3/2})_{c'}$; and $(SiO_{4/2})_{d'}$. Generally, the value of a' is within the range provided above for a, the value of b' is within the range provided above for b, the value of c' is within the range provided above for c, and the value of d' is within the range provided above for d. In this formula, a'+b'+c'+d'=1. Additionally, this formula is subject to the proviso that a is greater than a'.

The post-capped bodied siloxane resin comprises M, Q, and T-propyl units. As will be understood by one of ordinary skill in the art, the post-capped bodied siloxane resin may generally be described compositionally in the same manner as the bodied siloxane resin with regards to the D, T, and Q units. However, the post-capped bodied siloxane resin includes more M units than the bodied siloxane resin.

The $R^1$, $R^2$, and $R^3$ in the post-capped bodied siloxane resin is each independently selected from a substituted or unsubstituted carbon-containing group comprising from 1 to 10 carbon atoms, an amino group, and a sulfido group. The substituted or unsubstituted carbon-containing group comprising from 1 to 10 carbon atoms may be more specifically selected from substituted or unsubstituted hydrocarbyl groups containing from 1 to 10 carbon atoms. For the purposes of the description of this invention, a substituted hydrocarbyl group does not exclusively contain hydrogen and carbon atoms, i.e., the substituted hydrocarbyl group contains at least one atom, other than hydrogen and carbon atoms. Exemplary hydrocarbyl groups include, but are not limited to, alkyl groups (substituted and/or unsubstituted), alkenyl groups (substituted and/or unsubstituted), aryl groups (substituted and/or unsubstituted), and carbinol groups. More specific examples include, but are not limited to, methyl, ethyl, propyl, butyl, pentyl, hexyl, and octyl; phenyl, naphthyl, benzyl, tolyl, xylyl, xenyl, methylphenyl, 2-phenylethyl, 2-phenyl-2-methylethyl, chlorophenyl, bromophenyl and fluorophenyl, with the aryl group typically being phenyl.

In one or more embodiments, at least 0.40 moles of $R^3$ group per mole of silicon are propyl groups. Alternatively, at least 0.50, 0.60, 0.70, 0.80, 0.90, 0.95, 0.99, or 1.0 moles of $R^3$ group per mole of silicon are propyl groups. In another embodiment, 1.0 mole of $R^3$ groups per mole of silicon are propyl groups.

The method of producing the post-capped bodied siloxane resin includes capping the bodied siloxane resin with a silicon-containing M group capping agent to form the post-capped bodied siloxane resin. The silicon-containing M group capping agent comprises at least 0.5 moles of monofunctional units per mole of silicon. The post-capped bodied siloxane resin comprises the reaction product of the bodied siloxane resin, which comprises M, Q, and T-propyl units, and the silicon-containing M group capping agent.

The silicon-containing M group capping agent may comprise at least one $R^1_3SiO_{1/2}$ unit, at least one disiloxane, or at least one disilazane. In one embodiment, the silicon-containing M group capping agent comprises a compound having the following average formula:

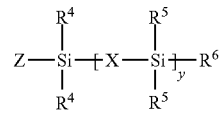

In this formula, 'Z' is Cl, an alkoxy group containing from 1 to 10 carbons, or a hydrocarbyl group containing from 1 to 10 carbon atoms; each $R^4$, $R^5$, and $R^6$ is independently a hydrocarbyl group containing from 1 to 10 carbon atoms; 'X' is O or NH, and 'y' ranges from 0 to 10. In one specific embodiment, 'y' ranges from 0 to 1. Although certain silicon containing M group capping agents are enumerated throughout this disclosure, other conventional capping agents are also contemplated for use. Alternatively, hydrolyzates of the compounds set forth above may be utilized as the silicon-containing M group capping agent.

The silicon-containing M group capping agent may also be a chlorosilane, an alkoxysilane, a disiloxane, or a disilazane. The silicon-containing M group capping agent may comprise a monofunctional silane, a siloxane, or a silazane. Suitable monofunctional silanes include, for example, triorganosilanes, such as halo-, alkoxy-, and carboxy-triorganosilanes. More particularly, specific examples of the silicon-containing M group capping agent include trimethylchlorosilane, trimethylmethoxysilane, hexamethyldisiloxane, diphenylmethylmethoxysilane, dimethylphenylmethoxysilane, diphenylmethylchorosilane, dimethylphenylchlorosilane, hexamethyldisilazane, and hydrolyzates thereof. In one embodiment, the silicon-containing M group capping agent comprises trimethylchlorosilane. Mixtures of silicon-containing M group capping agents may also be used if desired.

The amount of silicon-containing M group capping agent may range from 0.01 to 0.5 parts by weight of silicon-containing M group capping agent per part by weight of the bodied siloxane resin. Alternatively, the amount of silicon-containing M group capping agent may range from 0.05 to 0.3, or 0.10 to 0.20 parts by weight of silicon-containing M group capping agent per part by weight of the bodied siloxane resin.

As referred to herein, by "contents," it is intended to mean a compound or mixture of compounds present in the reaction vessel after addition of the silicon-containing M group capping agent, the bodied siloxane resin and various other components. Furthermore, it will be appreciated that the composition of the contents changes as the method proceeds through the various steps, through reactions, phase changes, distillation of certain components, and addition of new components.

A variety of reaction vessel types may be used with the method described herein. In one or more embodiment, the reaction vessel may be mixed using an agitator, stirring paddle, or other mixing technique. Alternatively, the contents of the reaction vessel are mixed and agitated with a series of mixing loops and mixing chambers. The reaction vessel may also be equipped with an inert gas purge. The inert gas purge may comprise nitrogen, argon, or other inert gas type that is non-reactive with the contents of the reaction vessel.

The step of capping the bodied siloxane resin may comprise a first heating step. The first heating step may include heating the contents of the reaction vessel to a temperature ranging from 25 to 60° C., or from 35 to 55° C. The first heating step may have a duration ranging from 30 to 600 minutes, or from 60 to 180 minutes.

After first heating step is completed, the contents of the reaction vessel may include the post-capped bodied siloxane resin, residual silicon-containing M group capping agent, reaction byproducts, and an organic solvent. Depending on the silicon-containing M-group capping agent utilized, the contents may include acidic or basic species. Typically, the contents may be processed in order to provide a neutralized product having an acid or base content ranging from 0 to 500, or 0 to 100 ppm of the acidic or basic species. The method may further comprise removing the residual silicon-containing M group capping agent and the reaction byproducts from the contents to form the neutralized product or a product having greater purity.

The step of removing the residual silicon-containing M group capping agent and the reaction byproducts may include performing a series of distillations. Water may be added before each subsequent distillation in order to aid with the removal of the reaction byproducts. In one embodiment, the step of removing the residual silicon-containing M group capping agent includes a preliminary distillation step, a primary distillation step, and a secondary distillation step.

The preliminary distillation step may include distilling the residual silicon-containing M group capping agent from the contents of the reaction vessel at a temperature ranging from 100 to 150° C. at ambient pressure in the absence of water.

The primary distillation step may include adding water to the contents of the reaction vessel and subsequently heating the contents of the reaction vessel to a temperature ranging from 100 to 150° C. at ambient pressure to remove the water, residual silicon-containing M group capping agent, and reaction byproducts through distillation.

The secondary distillation step may include adding water to the contents of the reaction vessel and subsequently heating the reaction vessel to a temperature ranging from 100 to 150° C. at ambient pressure to remove water, residual silicon-containing M group capping agent, and reaction byproducts through distillation.

The pressure of the preliminary, primary and second distillation steps may each independently range from 20 to 100 mmHg. As will be appreciated by one of ordinary skill in the art, as the pressure rises, greater temperatures will also be required.

The step of removing water, residual silicon-containing M group capping agent, and reaction by-products from the contents of the reaction vessel may be conducted in any number of steps sufficient to form the neutralized product or the product having greater purity. Furthermore, other techniques of removing the water, residual silicon-containing M group capping agent, and reaction by-products are contemplated, such as through the addition of a neutralizing agent and subsequent filtration.

As mentioned above, the bodied siloxane resin may be provided in the organic solvent. In one embodiment, the organic solvent comprises one or more hydrocarbons, such as aromatic hydrocarbons. In one specific embodiment, the organic solvent comprises toluene and xylene. Alternatively, the organic solvent may comprise benzene, toluene, xylene, or similar aromatic hydrocarbons; hexane, heptane, isooctane, or similar linear or partially branched saturated hydrocarbons; and cyclohexane, or similar aliphatic hydrocarbons; and blends thereof may be suitable. Excess organic solvent may be added to the mixture along with a co-solvent, such as an organic alcohol. Alcohols suitable for these purposes include, but are not limited to, methanol, ethanol, n-propyl alcohol, isopropyl alcohol, butanol, methoxy ethanol, ethoxy ethanol, or similar alcohols.

If the bodied siloxane resin is capped with the silicon containing M group capping agent in the presence of the organic solvent, then the method may further comprise conducting a solvent-exchange between the organic solvent and the alternative carrier solvent.

The alternative carrier solvent may comprise isododecane, 2-butyloctanol, isohexadecane, $C_{12-15}$ alkyl benzoate, castor oil, hydrogenated palm oil, glycerin, or isopropyl palmitate. Alternatively, the alternative carrier solvent may comprise a cyclic siloxane, short chain siloxane, or some other form of hydrocarbon solvent. Short chain siloxane fluids are typically understood to mean those siloxanes fluids having a molecular weight ($M_w$) ranging from 200 to 700. If the alternative carrier solvent used in the solvent-exchange step is a hydrocarbon solvent, an aliphatic hydrocarbon solvent is preferable.

During the solvent exchange step, the post-capped bodied siloxane resin and the organic solvent are heated during a first distillation step under reduced pressure to remove a portion of the organic solvent via distillation. The temperature of the first distillation step may range from 50 to 150° C. The pressure of the first distillation step may range from 20 to 100 mmHg. As will be appreciated by one of ordinary skill in the art, as the pressure of the first distillation step rises, greater temperatures will also be required.

The solvent exchange step may also include the addition of the alternative carrier solvent to the post-capped bodied siloxane resin in the reaction vessel. The addition of the alternative carrier solvent may be conducted after the first distillation step.

The solvent exchange step may further include a second distillation step. During the second distillation step, the reaction vessel and contents thereof may be heated to a temperature ranging from 50 to 150° C. and a pressure ranging from 20 to 100 mmHg. In addition, before the second distillation step, additional alternative carrier solvent may be added.

The solvent exchange step may include additional distillation steps other than the first distillation step and second distillation step described immediately above. Furthermore, the addition of alternative carrier solvent may be repeated intermittently before or after the completion of any distillation steps until the post-capped bodied siloxane resin contained in the alternative carrier solvent has a non-volatile content ranging from 10 to 90%, or from 40 to 75%. Alternatively, other techniques of solvent exchange may be utilized with the method and compositions disclosed herein.

The bodied siloxane resin may be exemplified by, but not limited to, the following formulas:

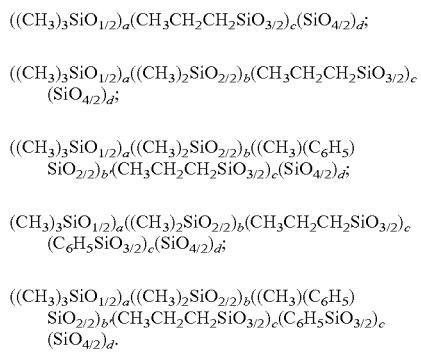

In the above formulas defining the siloxane resin, 'a' ranges from 0.05 to 0.5, the sum of 'b'+'b'' ranges from 0 to 0.3, 'c' ranges from 0.05 to 0.65, and 'd' ranges from 0.05 to 0.6.

A polyorganosiloxane can optionally be included in the method herein. Polyorganosiloxanes which may be added include D units and/or T units. The polyorganosiloxane can be added to introduce various D and/or T units into the bodied siloxane resins (before or after capping with additional M units) to alter its properties. The structure or formula of the polyorganosiloxane is not restrictive, providing the polyorganosiloxane contains some measurable quantity of D units or T units.

The polyorganosiloxane may contain any combination of M, D, T and Q units, provided at least some D or T units are present. Thus, the polyorganosiloxane can be selected from any of the fluid, gum, or resinous silicones known in the art comprising D or T units, or combinations thereof. The D units typically contain methyl or phenyl substituent groups, which can be designated as $D^{Me}$ and $D^{Ph}$ respectively, or any combinations thereof. The T units typically contain methyl or phenyl substituent groups, which can be designated as $T^{Me}$ and $T^{Ph}$ respectively, or any combinations thereof. The polyorganosiloxane can be a linear polydiorganosiloxane fluid having a viscosity of 10-1000 mm²/s. Typically the polydiorganosiloxane fluid is polydimethylsiloxane, or a polymethylphenylsiloxane. The polyorganosiloxane can also be an organosilsesquioxane. The organosilsesquioxane resin typically is a methylsilsesquioxane resin or a phenylsilsequioxane resin.

Furthermore, any individual D, T or Q units of the bodied siloxane resins can also contain a hydroxyl group and/or alkoxy group.

The post-capped bodied siloxane resin described herein may be produced with a batch, semi-continuous, or continuous process.

The following examples are intended to illustrate the invention and are not to be viewed in any way as limiting to the scope of the invention. Furthermore, as used below, GPC³ refers to triple detection gel permeation chromatography. The GPC³ test was performed with a Viscotek T-305 Triple Detector Array along with a Viscotek GPC Max.

In order to perform the GPC³ test, samples to be analyzed were first diluted in Tetrahydrofuran (THF) (0.100 g sample dissolved in 5 g THF), filtered with a 0.45 micrometer polytetrafluoroethylene filter. The injection volume for the GPC³ analysis was 200 microliters. Columns used for the GPC³ analysis includes: three PL gel Mixed B's and a guard column. Columns and all detectors were heated to 35° C. The GPC³ instrument was calibrated with a 100 μL injection of ASTM certified polystyrene, having a molecular weight ($M_w$) of 113,500.

EXAMPLES

Preparation of the bodied siloxane resin comprising M, Q, and T-propyl units: an MQ resin solution (171.21 g of 70.3% non-volatile content in xylene), a solution of propylsilsesquioxane (346.27 g of 80.9% NVC in toluene), xylenes (283.20 g), and KOH solution (4.5 g of 48% KOH in deionized water) were added to a reaction flask. The reaction mixture was heated with removal of water via azeotropic distillation, followed by two hours heating at 136° C. After cooling below 40° C., glacial acetic acid (0.39 g) was added to neutralize the basic catalyst. After further cooling to 25° C., the reaction mixture was further dried by adding anhydrous magnesium sulfate (20 g), and then stirred for one hour. The product was pressure-filtered (0.45 micron filter paper), yielding ~700 g of a slightly hazy, colorless liquid. Non-volatile content testing (2 grams product solution in 2-inch aluminum pan heated to 150° C. for 2 hours) indicated the solution contained 49.5 wt % NVC. GPC³ indicated a resin weight-averaged ($M_w$) molecular weight of 323,000 Daltons. ²⁹SiNMR (20 wt % product NVC in CDCl₃,0.02 M Cr(acac)₃) indicates silanol content is 0.016 g OH per gram resin NVC.

Capping of the bodied siloxane resin with a silicon-containing M group capping agent: the bodied siloxane resin (250.20 g solution, at 49.53% NVC) and 4.00 g of chlorotrimethylsilane (4.00 g) were combined in a flask. The reaction was heated to reflux (54-55° C.) for two hours, and then cooled to ambient temperature. The reaction flask was fitted with a Dean-Stark apparatus itself fitted with a water-cooled condenser, and the reaction mixture heated to 138° C. and approximately 20 g of condensate collected and removed, then the reaction mixture cooled to 55° C. The Dean-Stark trap was then refilled with fresh xylene and deionized water (approx. 2 g) added to the reaction mixture. This mixture was heated to distill and remove residual chlorotrimethylsilane, chloride ions, and water over approximately 90 minutes. After cooling to ambient temperature, xylene (16.49 g) was added, yielding 202.49 g of a clear, light yellow product solution. Non-volatile content testing (2 grams product solution in 2-inch aluminum pan heated to 150° C. for 2 hours) indicated the solution contained 50.0 wt % non-volatile content. GPC³ indicated a resin weight-averaged ($M_w$) molecular weight of 377,000 Daltons. ²⁹Si NMR (20 wt % product NVC in CDCl₃,0.02 M Cr(acac)₃) indicates silanol content is 0.010 g OH per gram resin NVC.

Stability Study of Post-capped Bodied Siloxane Resins: Simulated aging was begun by adding approximately three grams of a sample to an aluminum pan, which was placed in a 110° C. oven. Five samples of each resin were prepared. At defined heating times, samples were removed from the oven, cooled, and their analysis compared to that of the initial solutions. Testing of each aged sample involved adding xylene to the aged sample and determining whether it could be re-dissolved or had gelled. If the material could be redissolved, a sample of aged material was also dissolved in 2 wt. % concentration in THF and submitted for triple detector GPC³ analysis. The stability of the bodied siloxane resin was evaluated. Furthermore, the stability of the post-capped bodied siloxane resin was evaluated.

TABLE 1

Aging of the Bodied Siloxane Resin

| Heat Aging Time (h) | Soluble in Xylenes | GPC³ $M_w$ |
|---|---|---|
| 0 | Y | 323,000 |
| 2 | Y | 1,320,000 |
| 4 | N | Gelled |
| 10 | N | Gelled |
| 29.5 | N | Gelled |
| 78 | N | Gelled |

TABLE 2

Aging of the Post-Capped Bodied Siloxane Resin

| Heat Aging Time (h) | Soluble in Xylenes | GPC³ $M_w$ |
|---|---|---|
| 0 | Y | 377,000 |
| 2 | Y | 398,000 |
| 4 | Y | 379,000 |
| 10 | Y | 376,000 |
| 29.5 | Y | 388,000 |
| 78 | Y | 415,000 |

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. It is intended that the invention not be limited to the particular embodiment disclosed as the best mode contemplated for carrying out this invention, but that the invention will include all embodiments falling within the scope of the appended claims.

What is claimed is:

1. A method of preparing a post-capped bodied siloxane resin, said method comprising:
   capping a bodied siloxane resin comprising M, Q, and T-propyl units with a silicon-containing M group capping agent in a reaction vessel to form the post-capped bodied siloxane resin.

2. The method of claim 1 wherein the step of capping the bodied siloxane resin with the silicon-containing M group capping agent is performed in the presence of an organic solvent, the method further comprising:
   conducting a solvent-exchange between the organic solvent and an alternative carrier solvent.

3. The method of claim 2 wherein the organic solvent comprises one or more hydrocarbons.

4. The method of claim 2 wherein the alternative carrier solvent comprises isododecane, 2-butyloctanol, isohexadecane, $C_{12-15}$ alkyl benzoate, castor oil, hydrogenated palm oil, glycerin, isopropyl palmitate, cyclic siloxane, short-chain siloxane, or aliphatic hydrocarbon.

5. The method of claim 1 wherein the step of capping the bodied siloxane resin comprises heating the bodied siloxane resin and silicon-containing M group capping agent to a temperature ranging from 25 to 60° C.

6. The method of claim 5 wherein the step of heating the bodied siloxane resin and the silicon-containing M group capping agent is conducted for a duration ranging from 30 to 600 minutes.

7. The method of claim 1 further comprising removing residual silicon-containing M group capping agent from the reaction vessel after the step of capping the bodied siloxane resin.

8. The method of claim 1 further comprising distilling residual silicon-containing M group capping agent from the reaction vessel.

9. The method of claim 1 wherein the bodied siloxane resin capped with the silicon-containing M group capping agent comprises the units:

$(R^1{}_3SiO_{1/2})_a$;

$(R^2{}_2SiO_{2/2})_b$;

$(R^3SiO_{3/2})_c$;

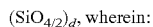
$(SiO_{4/2})_d$, wherein:

each $R^1$, $R^2$, and $R^3$ is independently selected from a substituted or unsubstituted carbon-containing group comprising from 1 to 10 carbon atoms, an amino group, and a sulfido group, with the proviso that at least 0.40 mole of the $R^3$ groups per mole of silicon in the $R^3SiO_{3/2}$ units are propyl groups, and a+b+c+d=1.

10. The method of claim 9 wherein a ranges from 0.05 to 0.50, b ranges from 0 to 0.30, c is greater than 0, and d ranges from 0.05 to 0.60.

11. The method of claim 1 wherein the bodied siloxane resin capped with the silicon-containing M group capping agent has an initial molecular weight ($M_{wi}$) and an aged molecular weight ($M_{wa}$) after aging the bodied siloxane resin capped with the silicon-containing M group capping agent at 110° C. for 70 hours, wherein the $M_{wa}$ increases 100% or less from the $M_{wi}$.

12. The method of claim 1 wherein said $M_{wa}$ increases 50% or less from said $M_{wi}$.

13. The method of claim 1 wherein the bodied siloxane resin capped with the silicon-containing M group capping agent contains less silanol groups than the bodied siloxane resin before being capped with the silicon-containing M group capping agent.

14. The method of claim 1 wherein the bodied siloxane resin capped with the silicon-containing M group capping agent comprises from 0.02 to 0.20 moles of silanol groups per mole of silicon.

15. The method of claim 1 wherein the bodied siloxane resin is selected from a group including:

$((CH_3)_3SiO_{1/2})_a(CH_3CH_2CH_2SiO_{3/2})_c(SiO_{4/2})_d$;

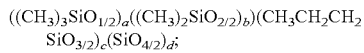
$((CH_3)_3SiO_{1/2})_a((CH_3)_2SiO_{2/2})_b)(CH_3CH_2CH_2SiO_{3/2})_c(SiO_{4/2})_d$;

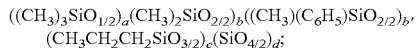
$((CH_3)_3SiO_{1/2})_a((CH_3)_2SiO_{2/2})_b((CH_3)(C_6H_5)SiO_{2/2})_{b'}(CH_3CH_2CH_2SiO_{3/2})_c(SiO_{4/2})_d$;

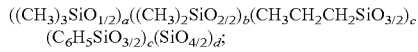
$((CH_3)_3SiO_{1/2})_a((CH_3)_2SiO_{2/2})_b(CH_3CH_2CH_2SiO_{3/2})_c(C_6H_5SiO_{3/2})_c(SiO_{4/2})_d$;

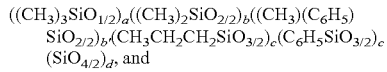
$((CH_3)_3SiO_{1/2})_a((CH_3)_2SiO_{2/2})_b((CH_3)(C_6H_5)SiO_{2/2})_{b'}(CH_3CH_2CH_2SiO_{3/2})_c(C_6H_5SiO_{3/2})_c(SiO_{4/2})_d$, and wherein a ranges from 0.05 to 0.5, the sum of b+b' ranges from 0 to 0.3, c ranges from 0.05 to 0.65, and d ranges from 0.05 to 0.6.

16. The method of claim 1 wherein the silicon-containing M group capping agent is represented by the following general formula:

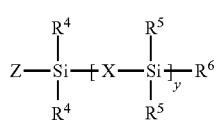

(5)

wherein:
- Z is Cl, an alkoxy group containing from 1 to 10 carbon atoms, or a hydrocarbyl group containing from 1 to 10 carbon atoms,
- each $R^4$, $R^5$, and $R^6$ is independently hydrocarbyl groups containing from 1 to 10 carbon atoms,
- X is O or NH, and
- y ranges from 0 to 10.

17. The method of claim 1 wherein the silicon-containing M group capping agent comprises trimethylchlorosilane, trimethylalkoxysilane, hexamethyldisiloxane, or hexamethyldisilazane.

* * * * *